(12) United States Patent
Sun

(10) Patent No.: US 10,364,504 B2
(45) Date of Patent: Jul. 30, 2019

(54) FABRICATION OF MULTILAYERED NANOSIZED POROUS MEMBRANES AND THEIR USE FOR MAKING NOVEL NANOSTRUCTURES

(71) Applicant: Li Sun, Houston, TX (US)

(72) Inventor: Li Sun, Houston, TX (US)

(73) Assignee: UNIVERSITY OF HOUSTON, Houston, TX (US)

( * ) Notice: Subject to any disclaimer, the term of this patent is extended or adjusted under 35 U.S.C. 154(b) by 485 days.

(21) Appl. No.: 13/775,925

(22) Filed: Feb. 25, 2013

(65) Prior Publication Data

US 2013/0228466 A1 Sep. 5, 2013

Related U.S. Application Data

(60) Provisional application No. 61/602,269, filed on Feb. 23, 2012.

(51) Int. Cl.
| | |
|---|---|
| *C25C 1/00* | (2006.01) |
| *B05D 3/06* | (2006.01) |
| *C23C 18/16* | (2006.01) |
| *B01D 67/00* | (2006.01) |
| *B01D 69/12* | (2006.01) |
| *C25D 1/00* | (2006.01) |
| *C23C 28/02* | (2006.01) |
| *B82Y 40/00* | (2011.01) |

(52) U.S. Cl.
CPC .......... *C25D 1/006* (2013.01); *B01D 67/006* (2013.01); *B01D 69/12* (2013.01); *B05D 3/06* (2013.01); *C23C 18/1657* (2013.01); *C23C 28/021* (2013.01); *C23C 28/023* (2013.01); *B82Y 40/00* (2013.01)

(58) Field of Classification Search
CPC .................................... C25D 1/00; B05D 3/06
See application file for complete search history.

(56) References Cited

U.S. PATENT DOCUMENTS

| | | | |
|---|---|---|---|
| 3,303,085 A * | 2/1967 | Price .................. | B01D 67/0032 204/157.44 |
| 5,914,150 A * | 6/1999 | Porter ........................ | C08J 3/09 213/13 |
| 2006/0000798 A1 | 1/2006 | Legras et al. | |

(Continued)

OTHER PUBLICATIONS

Gehrke, H-G., et al., "Self-aligned nanostructures created by swift heavy ion irradiation", J. Appl. Phys., 107, 094305, 2010.*

(Continued)

*Primary Examiner* — Harry D Wilkins, III
(74) *Attorney, Agent, or Firm* — Winstead PC

(57) ABSTRACT

Multilayer porous membranes and methods for fabricating the membranes may have applications in filtration, separation, and nanomanufacturing. The layers of the membrane may be selected based on different physiochemical properties, such as ionization rate and/or etch rate. The pores may be formed by high energy particle bombardment and chemical etching. In some embodiments, the multilayer porous membrane may be utilized to form complex nanostructures by selecting different materials for the layers based on physiochemical properties, layer thickness, stacking sequence, and/or varying the pore generation process.

20 Claims, 11 Drawing Sheets

(56) References Cited

U.S. PATENT DOCUMENTS

| | | | |
|---|---|---|---|
| 2007/0275499 A1* | 11/2007 | Corderman | B82Y 10/00 438/99 |
| 2009/0092893 A1 | 4/2009 | Takita et al. | |
| 2009/0120874 A1* | 5/2009 | Jensen | B01D 69/02 210/638 |
| 2009/0214851 A1* | 8/2009 | Corderman | B82Y 10/00 428/315.9 |
| 2012/0192934 A1* | 8/2012 | Fan | H01L 31/0296 136/255 |

OTHER PUBLICATIONS

Zhang, W.M., et al., "Fabrication of nanoporous silicon dioxide/silicon nitride membranes using etched ion track template", Nuclear Instruments and Methods in Physics Research B 266, 2008, 3166-3169.*

Spohr, R., "Ion Tracks and Microtechnology Principles and Applications", 1990, Chapter 6.*

Fischer, B.E., et al., "Production and use of nuclear tracks: imprinting structure on solids", Reviews of Modern Physics, vol. 55, No. 4, Oct. 1983.*

Ferain et al, Track-etch templates designed for micro- and nanofabrication, Nuclear Instruments and Methods in Physics Research Section B: Beam Interactions with Materials and Atoms, vol. 208, Aug. 2003, pp. 115-122.*

"Pore", https://www.merriam-webster.com/dictionary/pore, accessed on Dec. 30, 2016.*

Whitney et al, Fabrication and Magnetic Properties of Arrays of Metallic Nanowires, Science, vol. 261, No. 5126, Sep. 1993, pp. 1316-1319 (Year: 1993).*

Fan et al, Ordered Arrays of Dual-Diameter Nanopillars for Maximized Optical Absorption, Nano Letters, vol. 10, No. 10, May 2010, pp. 3823-3827 (Year: 2010).*

Khan et al, Annealing of Heavy Ion Latent Damage Trails in Muscovite Mica and CR-39 Plastic Track Detectors, Nuclear Tracks and Radiation Measurements, vol. 8, Nos. 1-4, 1984 (no month available), pp. 377-380 (Year: 1984).*

International Search Report and Written Opinion for PCT/US13/27636 dated Apr. 30, 2013.

Karim et al., "Electrodeposition of Copper Nanowires on Porous Polycarbonate Membranes", The Nucleus, vol. 46 (1-2), 2009; pp. 21-26.

Valizadeh et al., "Electrochemical synthesis of Ag/Co Multilaered Nanowires in Porous Polycarbonate Membranes", Thin Solid Films, vol. 402, No. 1-2, Jan. 1, 2002, pp. 262-271.

G. Zadow, S. Dodd, J. Moreland and A. P. Koretsky, "The fabrication of uniform cylindrical nanoshells and their use as spectrally tunable MRI contrast agents", Nanotechnology 20, 385301 (8 pp) (2009).

A. Ito, M. Shinkai, H. Honda and T. Kobayashi, "Medical Application of Functionalized Magnetic Nanoparticles", Journal of Bioscience and Bioengineering, vol. 100, No. 1, 2005, pp. 1-11.

Bernd Eberhard Fischer and Reimar Spohr, "Production and use of nuclear tracks: imprinting structure on solids", Reviews of Modern Physics, vol. 55, No. 4, Oct. 1983, pp. 907-948, figures 16-19, 21-28, 30-31.

R. L. Fleischer, P. B. Price and R. M. Walker, "Criterion for Registration in Dielectric Track Detectors", Physical Review, vol. 156, No. 2, Apr. 10, 1967, pp. 353-355.

V. P. Retal, M. J. M. Hummel, and W. H. van Haden, "Review on early technology assessments of nanotechnologies in oncology", Molecular Oncology 3, 2009, pp. 394-401.

G. Zabow, S. Dodd, J. Moreland and A. Koretsky, "Microengineered local field control for high-sensitivity multispectral MRI", Nature 453, Jun. 2008, pp. 1058-1064.

Hansen, P., et al., "Nuclear Tracks in Iron Garnet Films", The American Physical Society, Phys. Rev. B, Oct. 1982.

Spohr, Reimar, Report M2.1 Etch hints for polymers with high track-etch-rate, European Research Training Network EuNITT, Jul. 12, 2001.

* cited by examiner

 Bilayer membrane of two different materials

 Trilayer membrane of three different materials

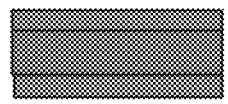 Trilayer membrane of two different materials

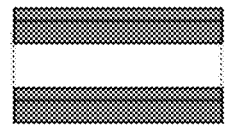 Multilayer membrane of two different materials with repeat bilayer structure

 Multilayer membrane of two different materials with individually controlled stacking sequence and thickness

 Multilayer membrane of two different materials with individually controlled stacking sequence and thickness

FIG. 5

Representative pore geometries in three individual layers
Representative multilayer membranes can be formed using the three layers
7. Potential applications
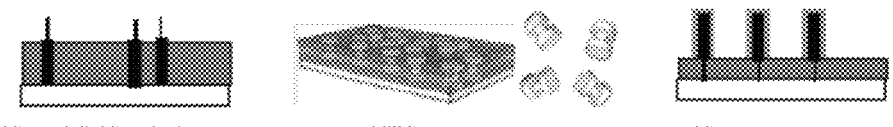
Aligned field emission arrays    MRI contrast agents    Nano-antenna array
other non-spherical nanostructures
FIG. 6

| | |
|---|---|
| Spin Speed (rpm) | 500, 1000, 15000 |
| Solvent | Chloroform |
| Atmosphere | N₂ gas |
| Concentration (g/ml) | 0.04 – 0.09 |
| Substrate | 1"x1" glass substrates |
| Spin Time (sec) | 120 |
| Baking Temperature (°C) | 180 |
| Baking Time (hr) | 2 |

FIG. 8

| PC Film thickness (um) | | | |
|---|---|---|---|
| | Spin Speed (rpm) | | |
| Concentration (g/ml) | 500 | 1000 | 1500 |
| 0.04 | 0.896 | 0.702 | 0.572 |
| 0.05 | 1.283 | 0.887 | 0.807 |
| 0.06 | 1.564 | 1.172 | 1.069 |
| 0.07 | 1.795 | 1.49 | 1.35 |
| 0.08 | 2.468 | 1.789 | 1.595 |
| 0.08 | 2.791 | 2.245 | 2.013 |

FIG. 9

| | |
|---|---|
| Spin Speed (rpm) | 500, 1000, 15000 |
| Solvent | Chloroform:TFA (VR=5:1) |
| Atmosphere | N₂ gas |
| Concentration (g/ml) | 0.05 – 0.09 |
| Substrate | 1"x1" glass substrates |
| Spin Time (sec) | 120 |
| Baking Temperature (°C) | 180 |
| Baking Time (hr) | 2 |

FIG. 10

| PET Film thickness (um) | | | |
|---|---|---|---|
| | Spin Speed (rpm) | | |
| Concentration (g/ml) | 500 | 1000 | 1500 |
| 0.05 | .783 | .649 | .742 |
| 0.06 | .914 | .856 | .891 |
| 0.07 | 1.432 | 1.09 | 1.274 |
| 0.08 | 1.742 | 1.297 | 1.28 |
| 0.09 | 2.058 | 1.766 | 1.534 |

FIG. 11

| Muscovite Mica | |
|---|---|
| Thickness (um) | 5 |
| Crystal Orientation | 1,0,0 |
| IRRADIATION | |
| Ion Species | $Ni^{8+}$ |
| Ion Energy (MeV) | 16.5 |
| Dosage (particles/cm$^2$) | $3 \times 10^8$ |

FIG. 12

| SPIN COATING | |
|---|---|
| PET Spin Coating Setting | |
| Concentration (g/ml) | 0.09 |
| Spin Speed (rpm) | 500 |
| Spin Time (sec) | 120 |
| Solvent | Chlroform |
| Atmosphere | $N_2$ gas |
| Baking Temperature (°C) | 170 |
| Baking Time (hr) | 2 |
| Substrate | Ni-Cr-Steel |
| Avg Thickness (um) | 2 |
| IRRADIATION | |
| Ion Species | $Ni^{8+}$ |
| Ion Energy (MeV) | 9.18 |
| Dosage (particles/cm$^2$) | $3 \times 10^8$ |

FIG. 13

| SPIN COATING ||
|---|---|
| PC Spin Coating Setting ||
| Concentration (g/ml) | 0.09 |
| Spin Speed (rpm) | 1500 |
| Spin Time (sec) | 120 |
| Solvent | Chloroform |
| Atmosphere | $N_2$ gas |
| Baking Temperature (°C) | 170 |
| Baking Time (hr) | 2 |
| Substrate | Ni-Cr-Steel |
| Avg Thickness (um) | 2 |
| IRRADIATION ||
| Ion Species | $Ni^{8+}$ |
| Ion Energy (MeV) | 16.5 |
| Dosage (particles/cm²) | $3 \times 10^9$ |

FIG. 14

| SPIN COATING ||||
|---|---|---|---|
| PET Spin Coating Setting || PC Spin Coating Settings ||
| Concentration (g/ml) | 0.068 | Concentration (g/ml) | 0.063 |
| Spin Speed (rpm) | 500 | Spin Speed (rpm) | 500 |
| Spin Time (sec) | 120 | Spin Time (sec) | 120 |
| Solvent | Chloroform:TFA (VR=5:1) | Solvent | Chloroform |
| Atmosphere | $N_2$ gas | Atmosphere | $N_2$ gas |
| Baking Temperature (°C) | 170 | Baking Temperature (°C) | 170 |
| Baking Time (hr) | 2 | Baking Time (hr) | 2 |
| Substrate | Ni-Cr-Steel | Substrate | PET-Ni-Cr-Steel |
| Avg Thickness (um) | 1.25 | Avg Thickness (um) | 1.25 |

FIG. 15

FABRICATION OF MULTILAYERED NANOSIZED POROUS MEMBRANES AND THEIR USE FOR MAKING NOVEL NANOSTRUCTURES

RELATED APPLICATIONS

This application claims the benefit of U.S. Provisional Patent Application No. 61/602,269 to Li Sun, filed on Feb. 23, 2012, which is incorporated herein by reference.

STATEMENT REGARDING FEDERALLY SPONSORED RESEARCH

This invention was made with government support under Grant No. CMMI-0800886 awarded by the National Science Foundation. The government has certain rights in the invention.

FIELD OF THE INVENTION

This invention relates to methods for the design and fabrication of multilayered nanosized porous membranes with individually controllable pore sizes. More particularly, to membranes distribution in constituent layers, use for filtration, use for making novel nanostructures, and use for particles separation.

BACKGROUND OF INVENTION

Nanoscale materials science and application of nanotechnology calls for more efficient, reproducible and innovative technologies to synthesize novel multifunctional materials, structures and devices. Many potential applications of nanomaterials have been proposed with the expectation that novel physiochemical properties can be achieved in nanomaterials through the manipulation of material size and/or shape, and through the introduction of artificial interfaces and surface chemistry. Current practical applications of nanomaterials may be limited to thin film based devices or isotropic nanoparticles. Traditional top-down micro- and nanofabrication technologies provide the dimensional and compositional control, but they are often associated with complicated equipment, high cost processing, low yield, and limited versatility in altering material selection and design variations. On the other hand, chemical-based synthesis (oftentimes referred to as bottom-up nanofabrication technology) has the capability of producing large quantity of nanomaterials at low cost and high throughput, and sometimes even with non-spherical complicated geometry; but the control over nanoparticle size, shape, composition and deviation is often very limited.

In contrast, the synthesis of materials and structures utilizing nanoporous templates as disclosed herein offers a cost effective and high yield alternative in producing quasi-one dimensional nanomaterials. For example, when appropriate electrochemical synthesis approaches are developed, composition modulation can be introduced along the nanowire axis to achieve multifunctionalities. Synthesized nanomaterials can be easily released from templates and manipulated for them to become the building blocks for various applications.

Examples of nanoporous templates for nanofabrication include anodic oxidized alumina, nuclear track etched polymers, phase separated diblock copolymers, and mesoporous materials. All of them are single layered membrane containing cylindrical pores. Although recently developed multi-step anodic oxidation techniques indicates the possibility of creating a hierarchy pore structure, control of the pore size and distribution and production of the desired structures remains challenging. Furthermore, selective or partial dissolution of the matrix material remains difficult for further nanomanufacturing needs.

The methods and designs discussed herein make use of layers of materials with different chemical solubility and nuclear track etching characteristics that are put together to produce nanoporous templates with individually controllable nanosized pore diameters and pore distribution that are conceived to be selective to the removal of matrices materials of interest. The use of such templates allows for the cost-effective fabrication of unconventional shaped nanostructures with precise pore size, topography and composition which find useful application in the development of new materials.

Nano-sized functional materials hold great promises in transforming the current clinical methodologies through the development and integration of novel diagnosis technologies, therapeutic methods and targeted treatments. At the moment, nanomaterials used for biomedical applications are limited to spherical nanoparticles. The fabrication of well controlled non-spherical nanomaterials poises significant challenges for conventional synthesis methods including the top-down micro/nano fabrication and bottom-up chemical synthesis approaches. Most of the top-down synthesis methods require complicated lithographic technologies and expensive deposition/etching equipment. The techniques discussed herein have the capability of producing complicated structures with well controlled dimension and composition. They are suitable for medication or device level fabrication with well defined nanostructures. For top-down manufacturing, a change in the structure design often involves complete retooling and extended period of waiting time. Prototyping of nanosize structures are often expensive and time consuming. On the other hand, solution-based chemical synthesis has the capability to generate large number of simple nanostructures in short period of time at low cost, and has been extensively used in nanoparticle synthesis. However control over nanoparticles size, shape and composition is limited and remains to this day a limitation for large scale, industrial applications.

Nanoporous membranes have been extensively used as templates to produce nanostructures in addition to the extensive applications in filtering and substance separation. However, conventional nanoporous templates, such as the anodic oxidized alumina, nuclear track etched polymers, phase separated diblock copolymers, and mesoporous structures, contain cylindrical pores with length, density, distribution and sizes are limited by either intrinsic material properties or specific synthesizing methods. Such constrains on pore geometry and simplex template chemistry significantly limit the geometry nanostructures that can be produced.

The present invention overcomes the above-mentioned limitations to produce nanostructures with a wide variety of shapes and functionalities. Applications of such inventions include but are not limited to the cost-effective fabrication of magnetic nanostructures with controlled size, shape, morphology and composition for the delivery of enhanced NMR/MRI agents with improved biofunctionalities.

SUMMARY OF THE INVENTION

In one implementation, a method for fabricating a multilayer porous membrane is provided. First and second layers of a membrane are deposited on a substrate. The first layer may be a first material and the second layer may be a second material. The membrane may be irradiated with high energy particles to form one or more pores in said membrane. In some embodiments, additional layers may be deposited on the substrate. Multilayer porous membranes and methods for fabricating the membranes may have applications in filtration, separation, and nanomanufacturing.

Multilayer porous membrane may be utilized to form complex nanostructures by selecting different materials for the layers based on physiochemical properties, layer thickness, stacking sequence, and/or varying the pore generation process. In another implementation, a method for fabricating a nanostructure with a multilayer porous membrane is provided. A multilayer porous membrane is fabricated by depositing a first and second layer of a membrane on a substrate. The first layer may comprise a first material, and the second layer may comprise a second material. The membrane may be irradiated with high energy particles to form one or more pores in said membrane, and the membrane may also be etched after irradiation to complete formation of said one or more pores in said membrane. A nanostructure material is deposited in and through the pores of the membrane by preparing a metal layer on the membrane to aid in formation of a nanostructure, wherein said metal layer is an electrode. Additionally, an electrolyte solution is prepared for deposition of a nanostructure material in and through the pores of the membrane. In some embodiments, the nanostructure material is deposited in and through the pores of the membrane utilizing electrodeposition. Once deposition is complete, each layer of the membrane may be dissolved in a dissolving solution to extract said nanostructures.

In yet another implementation, the fabricated nanostructures may be three segment contrast agents with non-uniform diameters. These contrast agents can introduce well defined, uniform localized magnetic field and have open structures to allow field/nuclei interaction to generate NMR frequency responses.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 5 is an illustrative implementation of various multilayer arrangements;

FIG. 6 is an illustrative implementation various pore geometries, stacking sequences and nano structures;

FIG. 8 is an illustrative implementation of experimental conditions for spin coating PC films;

FIG. 9 is an illustrative implementation of film thickness of PC films vs. spins speed and concentration of solvent;

FIG. 10 is an illustrative implementation experimental conditions for spin coating PET;

FIG. 11 is an illustrative implementation PET film thickness measurements versus concentration and spin speed;

FIG. 12 is an illustrative implementation of experimental conditions for irradiation mica.

FIG. 13 is an illustrative implementation experimental conditions for irradiation and preparation of PET films;

FIG. 14 is an illustrative implementation experimental conditions for irradiation and preparation of PC films; and FIG. 15 is an illustrative implementation of experimental conditions for irradiation and preparation of bi-layered films composed of PET and PC.

DETAILED DESCRIPTION

Figure 1:
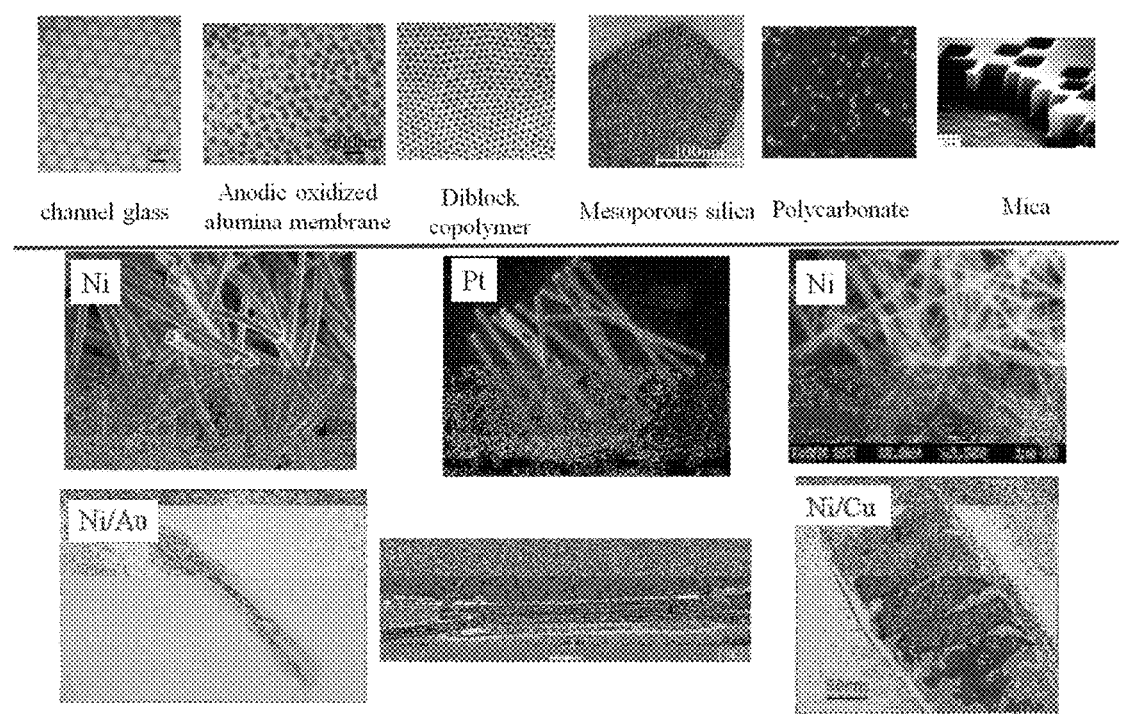
FIG. 1 is an illustrative implementation of SEM micrographs of various nanoporous templates and various electrodeposited nanowires obtained using the methods disclosed herein.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Multilayer porous membranes as described herein with individually controllable pore size, aspect ratio, distribution and physiochemical properties have useful applications in various industries. For example, the multilayer porous membranes have applications in two valuable industries, namely filtration/water treatment/particle separation and fabrication of a wide variety of non-traditional nanomaterials and structures in order to deliver functionalities are not otherwise achievable using known uniform nanoparticles, nanorods, nanowires and nanotubes. These membranes may be useful in biomedical applications for purification, extraction, cell separation, and spectroscopic analysis. Further applications may include but are not limited to water treatment, clarification and filtration, solvent purification, solvent extraction, isotope gas enrichment applications, petrochemical analysis and particle analysis, particle, protein, and cell filtering and extraction, and cell growth. Mulitlayer porous membranes and methods for manufacturing such membranes are discussed herein.

Conventional nanoporous templates, such as the anodic oxidized alumina, nuclear track etched polymers, phase separated diblock copolymers, and mesoporous structures, contain cylindrical pores with length, density, distribution and sizes are limited by either intrinsic material properties or specific synthesizing methods. Such constrains on pore geometry and simplex template chemistry significantly limits the geometry of nanostructures that can be produced by conventional nanoporous templates.

Embodiments of the multilayer porous membrane discussed herein relate to concepts and methods for the design and fabrication of multilayered nanosized porous membranes with individually controllable pore sizes in constituent layers and with controlled distribution, and/or density; as well as their use as templates and for the purpose of fabricating complex nanostructures. More specifically, in some embodiments, new methods that involve combining several types of layers arranged into multilayers (and referred to as templates), with the possibility of varying stacking sequence, layer thickness, pore shape and pore size, pore distribution, and pore density are discussed herein.

In some embodiments, methods for fabricating multilayered porous membranes may involve the following steps: (1) Preparing a material for deposition. For example, a bulk polymer of choice may be dissolved, such as but not limited to polycarbonate, polyethylene-terephthalate, polypropylene, polyamide, acetate-cellulose, in an appropriate solvent such as but not limited to chloroform, trifluoracetic-acid, dichloromethane, or acetone. (2) Coating the material solution on the substrate of choice, such as but not limited to cleaved muscovite mica or flat substrate (for example Si coated with a gold layer), under conditions described in FIGS. 8 and 9 for polycarbonate (PC), and FIGS. 10 and 11 for polyethylene terephthalate (PET) to obtain polymer layers of desirable thickness. The solution may be coated on by any suitable coating process such as but not limited to spin coating, dip coating (casting), spray, high temperature joining, or the like. (3) In some embodiments, it may be desirable to bake the membrane layers in vacuum at elevated temperatures. For example, if the abovementioned spin coating is done, the membrane layers may be baked in vacuum at elevated temperatures. (4) Cooling the membrane layers overnight to ensure stability and bonding of films onto the substrate. (5) Repeating steps (1) through (4) with the same or different material deposition solutions and as many times as necessary to create the desired number and desired sequence of layers. (6) Irradiating the resulted membrane layers with high energy particle to generate controlled damage tracks in the multilayers. FIGS. 13, 14 and 15 show exemplary irradiation conditions. (7) Irradiated membranes are subjected to corresponding chemical etchants (for example, NaOH for PC and PET and HF for mica) to obtain desirable porous templates. The structures that result from steps (1) to (7) are referred to as multilayer porous membranes. Note that the sequence and the specific steps discussed above are provided for illustrative purposes only. The specific steps required and order of the steps may vary in accordance with the materials or fabrication options selected. In some cases steps may be omitted, such as steps 3 and 4; steps may be added; or the sequence of steps may be rearranged.

In addition to the polymer examples provided above, nonlimiting examples of potential materials for the membrane may include organic or inorganic materials. For example, organic materials may include polycarbonate $(C_{16}H_{14}O_3)_n$, polyethylene terephthalate $(C_{10}H_8O_4)_n$, cellulose acetate $(C_6H_7O_2(OH)_3)_n$, PTFE (polytetrafluoroethylene) $(C_2F_4)_n$, or the like where nuclear track can be formed. For example, inorganic materials may include Mica (Aluminum potassium silicate), Si, Glass, or the like where the nuclear track can be formed.

Figure 3:
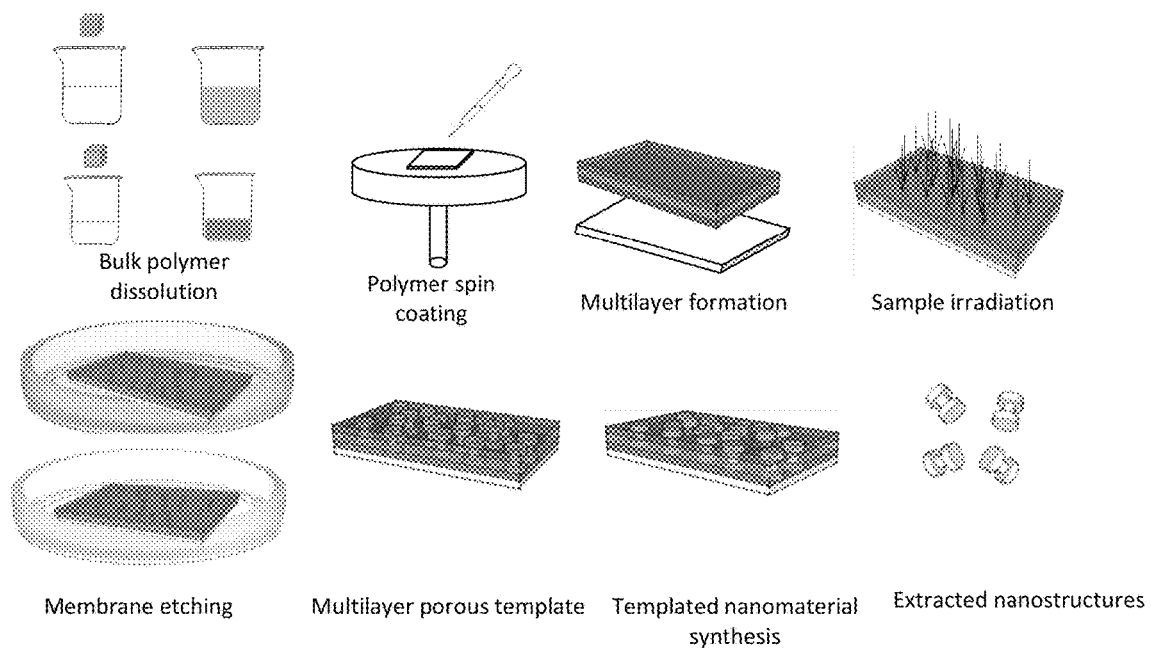
FIG. 3 is an illustrative implementation of the process of fabricating multilayered porous membranes and their use as templates for nanomanufacturing purposes.
Figure 4A:
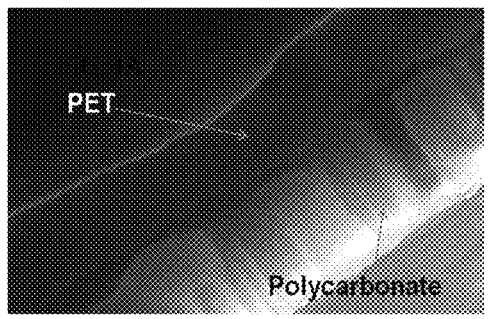
FIGS. 4A-4D are illustrative implementations of SEM micrographs of (FIGS. 4A-4B) cross-section of a PC/PET bilayer, and nuclear track etched pores in (FIG. 4C) PET and, (FIG. 4D) mica.
Figure 4B:
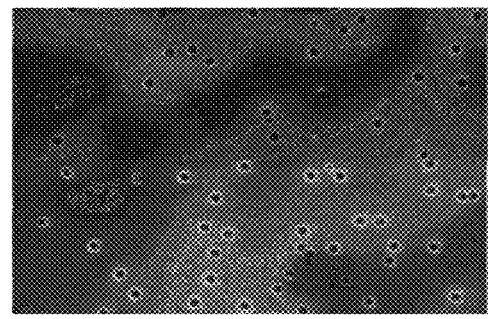
Figure 4C:
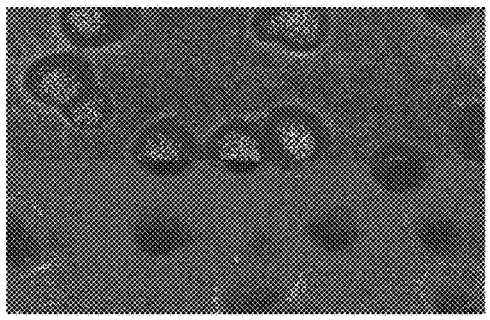
Figure 4D:
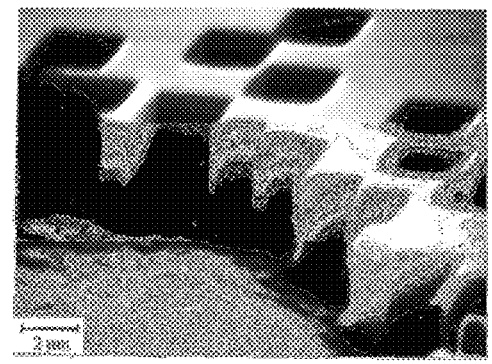

FIG. 3 is an illustrative schematic of an embodiment of a process for forming a multilayer porous membrane. FIGS. 4A-D show exemplary multilayer porous membranes, particularly results for a bilayer made of polycarbonate (PC) and polyethylene terephthalate (PET) formed on mica substrate. More specifically, FIG. 4A shows a cross section of such bilayer, and FIG. 4B shows the formation of nanosized pores after high energy particle bombardment. FIG. 4C shows pores after electrochemical etching, and FIG. 4D shows pores in single crystal muscovite mica.

FIG. 5 is an illustrative embodiment of various multilayer arrangements. Nonlimiting examples of multilayer arrangements may include a bilayer membrane of two different materials, trilayer membrane with three different materials, trilayer membrane with two different materials, multilayer membrane of two different materials with repeat bilayer structure, multilayer membrane of two different materials with individually controlled stacking sequence and thickness, multilayer membrane of two different materials with individually controlled stacking sequence and thickness.

The nuclear track formation discussed in steps 6 may utilize high energy particles generated by fission products from nuclear reaction or particles generated by an accelerator. Energy of the particle, particle species and material track registration characteristics will determine nuclear track depth. Flux of high energy particles will dictate the pore density. Regarding step 7, based on the different track etching characteristics of constituent layers, single or multiple radiation and etching processes can be used. The capability of control materials stacking sequences, and pore etching rates and flux density of individual layers will allow the production of a wide range of multilayer nanoporous membranes with different pore geometries. FIG. 6 is an illustration of several pore geometries for the membrane. The pore distribution and stacking sequence of the layer can be utilized to achieve desired shapes. Further, the materials utilized for the layers can also be utilized. Nonlimiting examples of potential applications for nanostructures formed using the multilayer porous membrane may include aligned field emission arrays, MRI contrast agents, nanoantenna arrays, or the like. Nonlimiting examples of complex nanostructures that can be manufactured utilizing the methods discussed herein are also shown in FIG. 6.

Figure 2A:
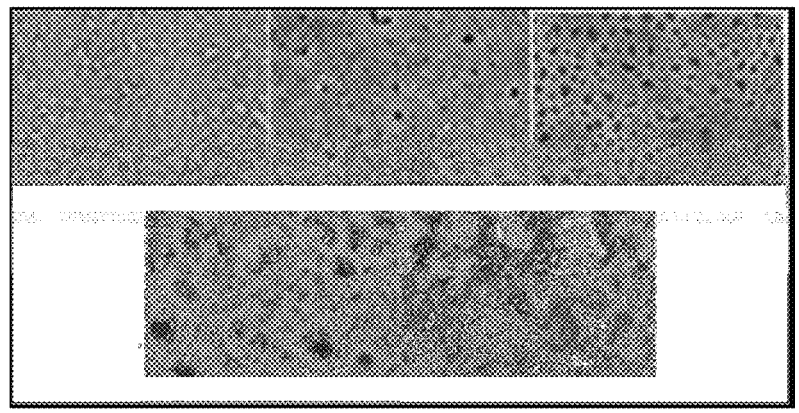
FIG. 2A shows an illustrative implementation of electrochemical deposition and dealloying of NixCu1-x demonstrating the fabrication of nanoporous structures with controlled structures and morphology.
Figure 2B:
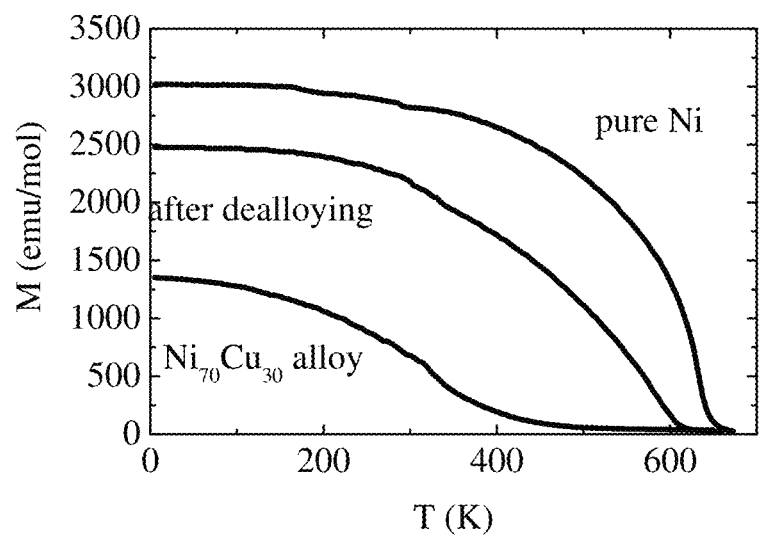
FIG. 2B shows magnetic properties.

In some embodiments, multilayer porous membranes may be utilized to form complex nanostructures. Methods for fabricating novel nanostructures involve the following steps: (1) Utilizing a multilayer porous membrane(s) as templates to fabricate the complex nanostructures. (2) Preparing the multilayer porous membrane for the formation of a nanostructure. For example, if formation of the nanostructures involves electrodeposition, it may be necessary to deposit a metal on the multilayer porous membrane to make it electrically active, as well as to produce a worker electrode. The metal may be any suitable material such as but not limited to gold, copper, silver, or the like. The metal may be deposited utilizing any suitable deposition method such as but not limited to sputtering, CVD, PVD, or the like. In some embodiments, the metal may be present on the multilayer porous membrane prior to deposition of the layers. (3) Preparing a material for deposition in and through the pores of the multilayer porous membrane. For example, the metal coated-multilayer porous membrane may be dipped in a solution containing an aqueous electrolyte solution, such as but not limited to $NiCl_2$. (4) Depositing a material in and through the pores of the multilayer porous membrane. For example, a metal may be deposited in and through the pores by electrodeposition using a conventional electrochemical cell. For example Ni metal may be electrodeposited at a potential of −1V vs. Ag/AgCl reference electrode until current density vs. time plot shows a sharp increase in current indicating overgrowth of porous films. (5) Extracting the formed nanostructure from the multilayer porous membrane by dissolving the various layer of the multilayer porous membrane. For example, the membrane may be dissolved by first dissolving the polymer multilayer in a chloroform bath, and dissolving the mica substrate in a 40% HF solution. Note that the sequence, the specific steps and the chemicals including concentration discussed above are provided for illustrative purposes only. The specific steps required, chemicals and order of the steps may vary in accordance with the materials or fabrication options selected. In some cases steps may be omitted; steps may be added; or the sequence of steps may be rearranged. FIGS. 2A-2B are illustrative implementations showing electrochemical deposition and dealloying of $Ni_xCu_{1-x}$ throughout the fabrication of nanoporous structures with controlled structures and morphology, as well as the magnetic properties of the nanoporous structure.

The choice of the electrolytes in step (3) directly impacts the nature of the resulting nanostructure. For example, the use of a $NiCl_2$ solution will lead to the formation of Ni (metal) nanostructures. Many other electrolyte solutions are suitable for electrodeposition can be used, including but not limited to noble metals, transition metals, alloys and certain semiconductors and semimetals, or combinations thereof. FIG. 1 provides nonlimiting examples of multilayer porous membranes and nanostructures that are fabricated using the methods disclosed herein. FIG. 1 shows SEM micrographs of multilayer porous membranes (top panel) and the resulting magnetic nanostructures made from such templates. These nanowires display controllable shape anisotropy, size dependent magnetic hysteresis, different surface chemical affinity and unique magneto-transport properties. The bottom panel of FIG. 1 displays well-defined multilayered nanowires, nanocrystalline thin films and nanoporous materials with controlled composition and morphology, such as but not limited to Ni, Pt, NiCu, and Ni/Au wires as illustrated by the middle and low panels of FIG. 1. Such nanowires show controllable shape anisotropy, size dependent magnetic hysteresis, different surface chemical affinity and unique magneto-transport properties. These alloy nanowires can be fabricated by mixing electrolyte solutions, and by applying different potentials during deposition. As a result of methods disclosed herein, both intrinsic (magnetic moment and Curie temperature) and extrinsic (shape anisotropy, saturation magnetization, remnant magnetization, and coercitivity) magnetic properties of these nanoporous materials exhibit wide range of adjustability.

The method for forming nanostructures utilizing the multilayered porous membrane can form nanostructures of any suitable materials. For example, while electrodeposition is suitable for various metals, semimetals, or semiconductors, other deposition methods may be necessary to form nonmetallic nanostructures with the multilayered porous membrane. While the above method utilizes electrodeposition, it will be recognized by one of ordinary skill in the art that the method may be modified to accommodate any other suitable deposition method such as but not limited to electroless deposition, physical or chemical evaporation, polymerization, precipitation, catalytic growth, molding, or the like.

Figure 7A:
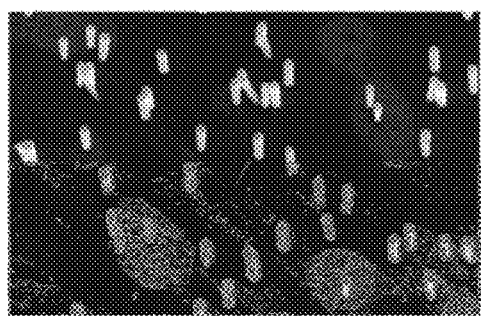
FIGS. 7A-7D are an illustrative implementation of SEM micrographs of electrodeposited Ni nanowires from (FIG. 7A), (FIG. 7B) a single layer membrane, and (FIG. 7C) and (FIG. 7D) a bilayer membrane.
Figure 7B:
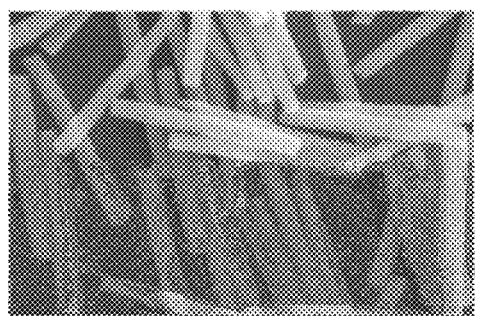
Figure 7C:
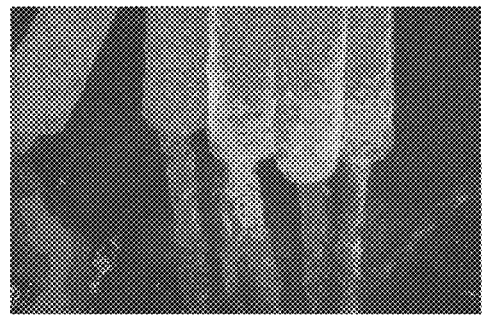
Figure 7D:
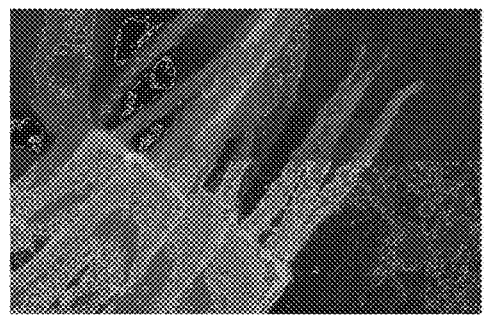

It should be noted that the profile of the resulting nanostructures is influenced by the profile of the pores that are created in the multilayer porous membranes (templates). For example, basic shapes include circles, which will then lead to the formation of spheres and/or wires such as shown in FIGS. 7A and 7B though more complex shapes can be achieved by heavy irradiation of multilayered films, where each film has either a different ionization potential and/or etching rate. Additionally, the shapes of the formed nanostructures can also be influenced by layer thickness, stacking sequence, and/or varying the pore generation process. An illustration of more complex shapes is depicted in FIG. 3 where dumbbell template shapes lead to dumbbell nanostructures. This dumbbell shape is fabricated using a tri-layered template, where the outer layers are of lower ionization potential than the most inner layer. Due to this multilayer structure, the central layer will form smaller pores than the outermost layers after heavy ion irradiation. Another way of producing this dumbbell shape is ensuring the central layer has a lower etching rate than the outer layers, which also allows for a dumbbell shape to be made during the etching. Another example of fabricated nanostructures is shown in FIGS. 7C and 7D. These multi-diameter nanowires, or segmented nanowires, are obtained using a template that provides a bilayer porous membrane with different pore dimensions, including both diameter and shape. In this specific case, the top layer is made of a PC layer with pore size averaging 180 nm and the bottom layer is made of PET with smaller pore size averaging 80 nm. These pores are etched by exposing the irradiating film to an aqueous solution of 6M NaOH for two hours, followed by electrodeposition of $NiCl_2$ at an applied potential of −1V versus reference electrode. Non-limiting examples of the different shapes that can be achieve using the methods discussed herein include dumbbells or barbells, cylinders or nanowires with more than one diameter, a base with multiple nanowires extending from the base, multi-segment nanostructures, structures with selective partial surface coatings or functionalizations, multilayered core-shell structures, branched structures or any other suitable shapes.

In some embodiments, a multilayer porous membrane may be utilized to form MRI contrast agents. Methods for fabricating enhanced MRI contrast agents involve the following steps: (1) Fabrication of a tri-layered porous membrane with individually controllable pore size using the methods described above. (2) Fabrication of three-segment magnetic nanostructures with tunable size, aspect ratio, composition possessing localized magnetic fields to deliver the desired MRI functionality. (3) Optimization of the biocompatibility of the resulting enhanced MRI contrast agents by both adjusting the composition and chemically modifying their surface. More specifically, step (2) involves the electrodeposition of an electrolyte solution that contains magnetic metallic ions into the pores of the porous template. After deposition, the films is then dissolved away to extract the three-segment nanowires. Note that the sequence and the specific steps discussed above are provided for illustrative purposes only. The specific steps required and order of the steps may vary in accordance with the materials or fabrication options selected. In some cases steps may be omitted; steps may be added; or the sequence of steps may be rearranged.

The interest in such enhanced MRI contrast agents is that they offer multichromatic properties which are otherwise not observed in known MRI contrast agents. Many known contrast agents use one agent only, typically Gd, which makes them monochromatic, i.e. responsive to only one specific magnetic field. By contrast, the enhanced contrast agents allow for the fabrication of three-segment nanostructures, each with a distinct localized and adjustable magnetic field referred to as "nanotag." Each nanotag introduces frequency multiplexing in NMR which means that a single contrast agent is able to respond simultaneously to three distinct magnetic fields, thereby significantly enhancing the ability to collect information using MRI. Although the proof-of-concept of three-segment and tubular contrast agent designs have been demonstrated, new methods discussed herein for their preparation and use goes beyond the top-down micro-fabrication or nanoparticle chemical synthesis are needed to meet the size, topography and physiological compatibility requirements for bio-applications.

In another embodiment, the multilayer porous membrane may be utilized to form three segment contrast agents. Methods for the fabrication of three segment contrast agents with non-uniform diameter and involve the following steps: (1) Determine the contrast agent dimension based on application requirements and desired local magnetic field strength. (2) Control spin coating conditions to achieve desired trilayer thickness. (3) Choose suitable irradiation conditions including particle species, energy and flux density. (4) Choose appropriate chemical etching conditions so that the nanopores have desirable size and geometry. (5) electrodeposit suitable materials. (5) chemically release the magnetic nanostructures to be used as MRI contrast agents. Tubular magnetic nanostructures can also be generated combining electrodeposition, selective etching and nanowire templating methods. Such novel contrast agents can introduce well defined, uniform localized magnetic field and have open structures to allow field/nuclei interaction to generate NMR frequency responses. To generate frequency dependent nuclear magnetic resonances (NMR) responses, the contrast agents need to be able to generate more than one accessible discreet localized uniform magnetic field for nuclei to generate frequency specific signals. Applications of the proposed methods include but are not limited to the cost-effective fabrication of magnetic nanostructures with controlled size, shape, morphology and composition for the delivery of enhanced NMR/MRI agents with improved biofunctionalities. Note that the sequence and the specific steps discussed above are provided for illustrative purposes only. The specific steps required and order of the steps may vary in accordance with the materials or fabrication options selected. In some cases steps may be omitted; steps may be added; or the sequence of steps may be rearranged.

The resulting magnetic nanostructure provided by the three segment contrast agent fabrication process discussed above may two ends with the same diameter joined by a smaller diameter middle segment. The three segment structure can be made of the same material or different materials during the fabrication process.

In another embodiment, methods for using contrast agents having more than one magnetic structure involving the following steps: (1) Design and fabricate more than one type of proposed contrast agent with distinct localized magnetic fields. (2) Surface functionalize different type of contrast agents if necessary. (3) During the imaging process, choose appropriate excitations corresponding to contrast agent characteristic frequency response to identify different types of contrast agent. 4) If necessary, reconstruct frequency dependent signals for colored image. Note that the sequence and the specific steps discussed above are provided for illustrative purposes only. The specific steps required and order of the steps may vary in accordance with the materials or fabrication options selected. In some cases steps may be omitted; steps may be added; or the sequence of steps may be rearranged.

EXPERIMENTAL EXAMPLES

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Example. Preparation of Multilayer Porous Membranes

Substrates for spin coating consist of either 1"×1"×5 μm muscovite mica, or 1"×1" substrates of 110 Si with 100 nm of sputtered Au, or other conductive layers that are suitable to be used as working electrode. Spin coating of PET is conducted using PET provided by McMaster Carr. Spin coating is conducted using a mixture of PET and Chloroform:Trifluoracetic Acid (vr=5:1). Films of 2 μm in thickness are achieved by spin coating concentrations of 0.09 g/ml of PET to Chloroform:TFA, on 10 μm [001] cleaved mica thin films at a rotation speed of 500 rpm for 120 s. After the solvent evaporation, the samples are baked in vacuum at 185° C. for 2 hours, followed by slow cooling to room temperature overnight. This would result in a uniform thick PET coating on mica. Polycarbonate pellets are purchased from Alfa Aesar (MW=45) and dissolved in chloroform to form a 0.09 g/cm$^3$ solution. The solution is then spin coated on the previously fabricated PET films to form a bi-layered polymer film. The resulting films are then baked in vacuum at 185° C. for 2 hours, and then slowly cooled overnight in order to ensure stability and bonding of films. Porous films of 100 muscovite mica are then irradiated with accelerated Kr atoms, at 15 MeV/nucleon with a K-500 cyclotron, in air, with a fluence of $1\times10^7$ to $2\times10^7$, from 1 to 250 seconds to achieve a sample pore density of $1\times10^7$ to $5\times10^9$ tracks/cm$^2$, followed by chemical etching with 20 wt % hydrofluoric acid. This process results in the formation of multilayer porous membranes.

Example. Fabrication of Nanostructures

Using the multilayer porous membranes as templates, nanowires may be fabricated as follows. The multilayer porous membrane is first sputtered with gold (to make it electrically active). The gold coated multilayer porous membrane is then dipped into a solution of 1M NiCl$_2$, and subject electrodeposition of Ni metal in and through the pores. This is done using an auxiliary electrode and a reference electrode that are then placed in the bath, and by applying a constant potential of −1V (vs. Ag/AgCl), leading to the formation of nanowires. The nanowires are then extracted from the multilayer porous membrane by dissolving the polymer films in a chloroform bath, and dissolving the mica substrate in a 40% HF acid bath.

While the invention described herein specifically focuses on methods for the fabrication of multilayered nanosized porous membranes and their use for making novel nanostructures, one of ordinary skills in the art, with the benefit of this disclosure, would recognize the extension of such approach to other systems.

While the invention described herein makes use of spin coating for the fabrication of multilayer membranes, multilayers of different material can alternatively be obtained using others means such as but not limited to dip coating (casting), spray, high temperature joining, or any other methods known to those skilled in this art. Spin coating can provide excellent film thickness control in the micron-submicron region, while other methods may be more suitable for industrial production.

While the invention described herein makes use of electrochemical deposition for the fabrication of nanoporous templates, other methods may be suitable such as but not limited to electroless deposition, physical and chemical evaporation, polymerization, precipitation, catalytic growth, and molding.

Although the invention has been disclosed with reference to its preferred embodiments, from reading this description those of skill in the art may appreciate changes and modification that may be made which do not depart from the scope and spirit of the invention as described above and claimed hereafter. The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A method for fabricating a nanostructure utilizing a multilayer porous membrane as a template, the method comprising:
    selecting a first layer for a multi-layer arrangement, wherein the first layer comprises a first material;
    depositing a second layer on the first layer without bonding via inter-diffusion, wherein the first or second layer is mica, the second layer comprises a second material with an etch rate or an ionization potential that is different from the first material, and the multi-layer arrangement formed is freestanding;
    irradiating the freestanding multi-layer arrangement once with high energy and subsequently etching the arrangement once via nuclear track processing to form one or more pores spanning through an entire thickness of both the first layer and second layer of said arrangement to form a multilayer porous template, wherein each of the one or more pores created by the irradiating and the etching steps provides cylinders or nanowires with more than one diameter; and
    depositing a nano structure material in and through the one or more pores of the multi-layer template to form a nanostructure, wherein the nanostructure has a shape corresponding to the cylinders or nanowires with more than one diameter.

2. The method of claim 1, further comprising depositing one or more additional layers on the second layer of said multi-layer arrangement prior to irradiating the multi-layer arrangement.

3. The method of claim 2, wherein the step of depositing the nanostructure material further comprises:
    depositing a metal layer on said template, wherein the metal layer forms a working electrode;
    preparing an aqueous electrolyte solution for deposition of a nanostructure material in and through the pores of the template, wherein said aqueous electrolyte solution contains magnetic metallic ions;
    depositing said nanostructure material in and through the pores of the multilayer porous template, wherein the nanostructure material is deposited by electrodeposition; and
    extracting the nanostructure from the multilayer porous template, wherein at least one layer of the multilayer porous template is dissolved by a dissolving solution to expose a portion of said nanostructures.

4. The method of claim 3, wherein the formation of the nanostructure further comprises the step of chemically modifying a surface of said nanostructures to enhance biocompatibility.

5. The method of claim 3, wherein said nanostructure provides three segments, and each of said segments provides a different diameter.

6. The method of claim 1, wherein said first or second material is a polymer, polycarbonate, polyethylene terephthalate, polypropylene, polyamide, cellulose acetate, PTFE, Mica, Si, or glass.

7. The method of claim 1, wherein the second layer is formed by spin coating, dip coating, or spray coating.

8. The method of claim 1, wherein the one or more pores provide voids in the template that are is the shape of a barbell, cylinders with more than one diameter, multi-segment nanostructures, structures with selective partial surface coatings or functionalizations, multilayered core-shell structures, or branched structures.

9. The method of claim 1, further comprising:
    baking the template in a vacuum at elevated temperatures; and
    cooling the template.

10. The method of claim 1, wherein the step of depositing the nanostructure material further comprises:
    depositing a metal layer on said multilayer porous template;

placing said multilayer porous template in an aqueous electrolyte solution;

performing electrodeposition until a sharp increase in current is detected; and dissolving said multilayer porous template to extract the nanostructures.

11. The method of claim 1, wherein the step of depositing the nanostructure material further comprises:

preparing the multilayer porous template for the formation of the nanostructure; and preparing the nanostructure material for deposition in and through the one or more pores of the multilayer porous template; and dissolving at least one layer of the template in a dissolving solution, while leaving at least one remaining layer of the template undissolved, to expose a portion of said nanostructure with an unexposed portion embedded in the at least one remaining layer.

12. The method of claim 11, wherein the nanostructure is formed in and through the one or more pores of said multilayer porous template by electrodeposition, electroless deposition, physical evaporation, chemical evaporation, polymerization, precipitation, catalytic growth, or molding.

13. The method of claim 11, wherein a metal layer is deposited on said multilayer porous template to prepare for the formation of the nanostructure, an aqueous electrolyte solution is prepared for depositing said nanostructure material within the one or more pores, and said multilayer porous template is placed in the aqueous electrolyte solution to deposit said nanostructure material in and through the pores of the multilayer porous template utilizing electrodeposition.

14. The method of claim 13, wherein the aqueous electrolyte solution provides a noble metal, transition metal, alloy, semiconductor, or semimetal.

15. A method for fabricating a nanostructure with a multilayer porous template, the method comprising:

preparing a multilayer porous template, wherein said multilayer porous template is fabricated utilizing the steps of, selecting a first layer for a multi-layer arrangement, wherein the first layer comprises a first material, depositing a second layer on the first layer without bonding via inter-diffusion, wherein the first or second layer is mica, the second layer comprises a second material with an etch rate or an ionization potential that is different from the first material, and the multi-layer arrangement formed is freestanding, irradiating the freestanding multi-layer arrangement once with high energy particles via nuclear track processing to form one or more pores in said multi-layer arrangement, and etching the multi-layer arrangement once after irradiation to complete formation of said one or more pores spanning through an entire thickness of the first layer and second layer of the multi-layer arrangement to form the multi-layer porous template, wherein each of the one or more pores provides cylinders or nanowires with more than one diameter; and forming a nanostructure with the multi-layer porous template, wherein said nanostructure is formed utilizing the steps of, preparing a metal layer on the template to aid in formation of the nanostructure, wherein said metal layer is an electrode, preparing an electrolyte solution for deposition of a nanostructure material in and through the pores of the template, depositing said nanostructure material in and through the pores of the template utilizing electrodeposition, and dissolving at least one layer of the template in a dissolving solution, while leaving at least one remaining layer of the template undissolved, to expose a portion of said nanostructure with an unexposed portion embedded in the at least one remaining layer, wherein the nanostructure has a shape corresponding to the cylinders or nanowires with more than one diameter.

16. The method of claim 15, further comprising depositing at least a third layer of said multi-layer arrangement on the second layer prior to irradiating the multi-layer arrangement.

17. The method of claim 16, wherein the electrolyte solution contains magnetic metallic ions.

18. The method of claim 17, wherein said nanostructure provides three segments, and each of said segments provides a different diameter.

19. The method of claim 16, wherein the electrolyte solution provides a noble metal, transition metal, alloy, semiconductor, or semimetal.

20. The method of claim 15, wherein said first or second material is a polymer, polycarbonate, polyethylene terephthalate, polypropylene, polyamide, cellulose acetate, PTFE, Mica, Si, or glass.

* * * * *